Patented Feb. 26, 1935

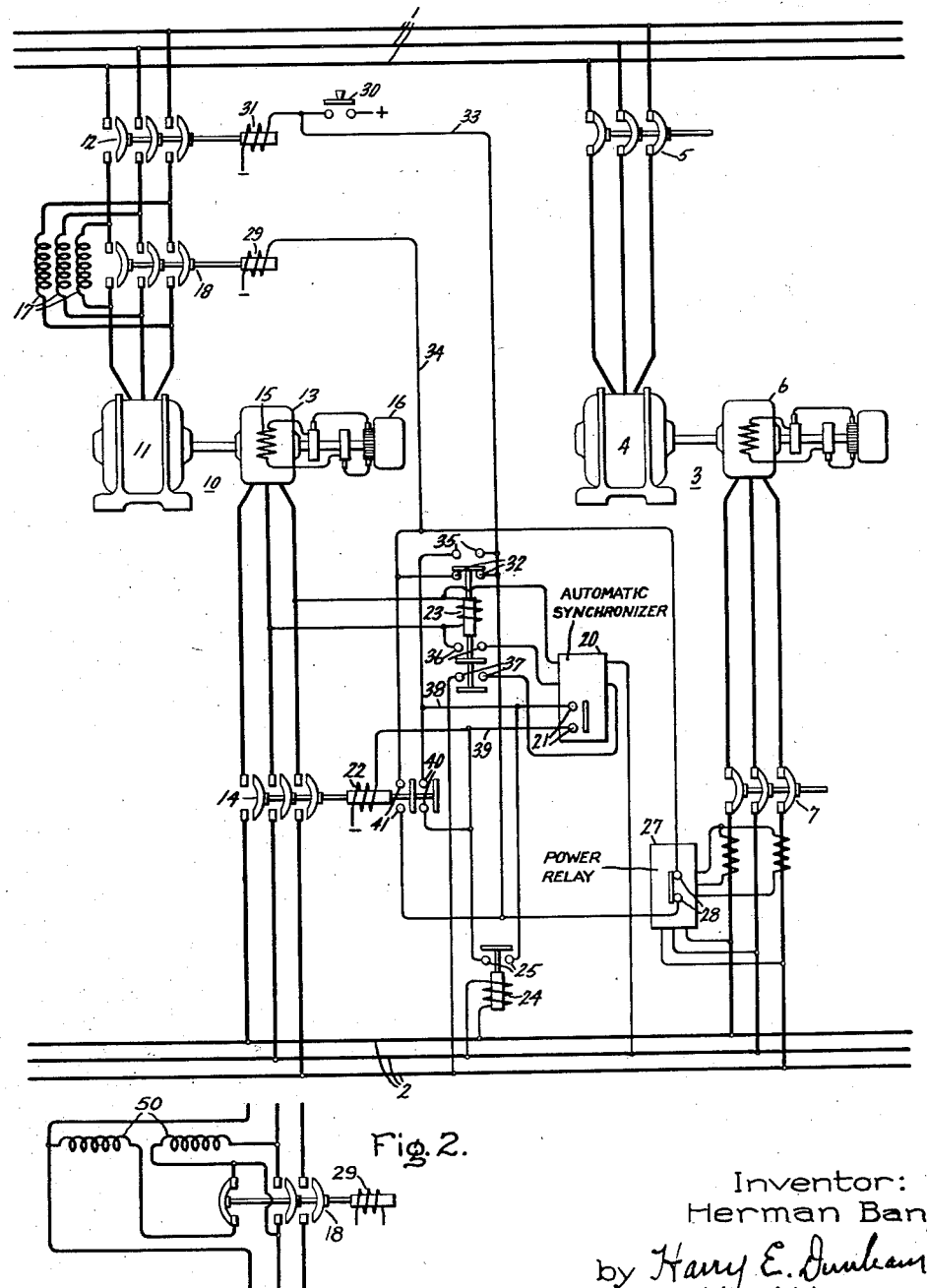

1,992,803

UNITED STATES PATENT OFFICE 1,992,803

CONTROL SYSTEM

Herman Bany, Lansdowne, Pa., assignor to General Electric Company, a corporation of New York Application April 26, 1934, Serial No. 722,423

9 Claims. (Cl. 172—281)

My invention relates to control systems and particularly to systems for controlling the connection of an induction-synchronous frequency changer between two alternating current circuits having different frequencies which vary relatively to each other, such for example as two alternating current circuits which are interconnected by another frequency changer consisting of an induction motor driving a synchronous generator.

One object of my invention is to provide an improved control system for interconnecting a frequency converter between two alternating current circuits.

Another object of my invention is to provide an improved control system for interconnecting an induction synchronous frequency converter between two alternating current circuits having different frequencies which vary relatively to each other.

My invention will be better understood from the following description when taken in connection with the accompanying drawing and its scope will be pointed out in the appended claims.

In the accompanying drawing, Fig. 1 diagrammatically illustrates a frequency converter control system embodying my invention, and Fig. 2 illustrates another form of voltage reducing means which may be used in the system shown in Fig. 1.

Referring to Fig. 1 of the accompanying drawing, 1 and 2 represent two alternating current polyphase circuits having different frequencies. The circuit 2 is normally supplied with power by a frequency converter 3 comprising an induction motor 4 connected to the circuit 1 by a suitable circuit breaker 5 and driving a synchronous generator 6 which is connected to the circuit 2 by means of a suitable circuit breaker 7. Since the speed of the induction motor 4 varies with the amount of power transferred from the circuit 1 to the circuit 2 by the frequency converter 3, it is evident that the frequency of the circuit 2 varies relatively to the frequency of the circuit 1 as the load connected to the circuit 2 varies.

In accordance with my invention, I provide an arrangement for connecting a second frequency converter in parallel with the converter 3 whereby the generator of the incoming frequency converter may be synchronized without excessive disturbances occurring on either of the two circuits and while the induction motor of the incoming frequency converter is connected to the circuit 1. This result is obtained by providing suitable means for causing the induction motor of the unloaded incoming frequency converter to drive the generator thereof during the synchronizing operation at nearly the same speed as the generator of the loaded frequency converter which is in operation is being driven, and by controlling the closing of the connections between the incoming generator and the circuit 2 by means of automatic synchronizing means of the type which initiates the operation of the closing means prior to phase coincidence of the voltages of the incoming generator and the circuit 2 at an angle which varies directly with the difference between the frequencies of the two voltages.

Such automatic synchronizers are so arranged that for all frequency differences within a predetermined range the automatic synchronizer initiates the operation of the circuit breaker closing means, which has a fixed closing time, at such a predetermined number of degrees prior to phase coincidence of the voltages that the circuit breaker in each case closes under exactly the same phase conditions of the voltages. For example, if it is desired to close the circuit breaker when the voltages are in phase coincidence and the closing time of the circuit breaker is such that, with a frequency difference of 0.2 cycles per second the automatic synchronizer has to initiate the operation of the closing means at 20° prior to phase coincidence, the automatic synchronizer has to initiate the operation of the closing means at 40° prior to phase coincidence in order to close the circuit breaker under the same phase conditions of the voltages when the frequency difference is 0.4 cycles per second.

In the embodiment of my invention illustrated in the drawing, I have shown a second frequency converter 10 comprising an induction motor 11 which is arranged to be connected to the circuit 1 by a suitable circuit breaker 12 and a synchronous converter 13 which is driven by the motor 11 and which is arranged to be connected to the circuit 2 by a suitable circuit breaker 14. The generator 13 has a field winding 15 which may be excited in any suitable manner, as by a direct-connected exciter 16, when the generator 13 is in operation.

In order to operate the unloaded frequency converter 10 during the synchronizing operation thereof, at nearly the same speed as the loaded converter 3, I provide suitable voltage reducing means, such as a polyphase reactor 17, and suitable switching means, such as a circuit breaker 18, whereby the reactor 17 is connected in series with the armature winding of the motor 11 when the switch 18 is open and the reactor 17 is removed from the circuit when the switch 18 is closed. The voltage reducing means is so designed that when it is connected in circuit, it decreases the voltage impressed across the line terminals of the motor so that the slip of the motor 11 is increased to such a predetermined value that the speed of the unloaded generator 13 is the same as the speed it has when it is loaded a predetermined amount.

For controlling the closing of the circuit breaker 14 so that it closes to connect the generator 13 to the circuit 2 under the same phase conditions of the voltages of the generator 13 and the circuit 2 irrespective of the frequency difference between these voltages, I provide a suitable automatic synchronizer 20, examples of which are well known in the art, which is so arranged that it closes its contacts 21 in an energizing circuit for the closing coil 22 of the circuit breaker 14 at different angles prior to phase coincidence of the voltages depending upon the frequency difference. In order to render the automatic synchronizer 20 operative to control the closing of the circuit breaker 14 when the generator 13 is in operation, I provide the voltage relay 23 which is connected and arranged in any suitable manner so that it responds to a predetermined voltage, preferably a predetermined subnormal voltage of the generator 13. The voltage relay 23, when it operates, completes the connections of the automatic synchronizer 20 to the generator 13 and to the circuit 2 so that the automatic synchronizer 20 operates to close its normally open contacts 21 when the proper phase relation exists between the voltages of the generator 13 and the circuit 2.

In order that the generator 13 may be connected to the circuit 2 as soon as the generator is in condition to supply power thereto, in case the circuit 2 is at that time deenergized, I provide a voltage relay 24 which is connected and arranged in any suitable manner so that it maintains its contacts 25 open as long as the voltage of the circuit 2 is above a predetermined value. The contacts 25 are connected in parallel with the contacts 21 of the automatic synchronizer 20 so that in case the circuit 2 is deenergized at the time the relay 23 operates, an energizing circuit is immediately completed through the contacts 25 of the relay 24 for the closing coil 22 of the circuit breaker 14.

Since the amount the motor 11 has to slip during the synchronizing operation in order to bring the frequency difference between the voltages of the generators 6 and 13 within the successful operating range of the automatic synchronizer 20, varies with the load on the generator 6, I provide suitable means for varying the slip of the motor 11 in accordance with the load on the generator 6 so as to maintain the frequency difference within a predetermined small range relative to the frequency change of the generator 6 for a predetermined range of load thereon. In the embodiment shown in the drawing this means includes a power responsive relay 27 which is connected and arranged in any suitable manner so that it opens its contacts 28 when the amount of power supplied by the generator 6 to the circuit 2 exceeds a predetermined value. The contacts 28 of the relay 27 control the circuit of the closing coil 29 of the switch 18 so that if during the synchronizing operation of the frequency converter 10 the load on the frequency converter 3 exceeds a predetermined value, the reactor 17 is connected in series with the motor 11. In this manner the slip of the motor 11 is increased sufficiently to decrease the frequency difference between the voltages of the generators 6 and 13 to within the successful operating frequency difference range of the automatic synchronizer 20. For example, assume that the decrease in frequency of the generator 6 at full load is 1.2%, that the maximum frequency difference between the generators 6 and 13 at which the automatic synchronizer 20 will operate successfully is .6% of the normal frequency of these generators and that the reactor 17 is so designed that when it is connected in circuit with the motor 11 and there is no load on the motor, the frequency of the generator is 1.2% below its no-load value. If the power relay 27 is then set to open its contacts when the load on the generator is equal to or greater than half the normal full load so that the reactor 17 is in circuit when the generator load is between half the normal full load and 1½ full load, it will be seen that over this entire range from no load to 1½ load, the maximum frequency difference of the generators 6 and 13 over which the automatic synchronizer 20 has to operate does not exceed its maximum range of .6% although the frequency of the generator 6 may decrease as much as 1.8%.

Any suitable means, examples of which are well known in the art, may be employed for effecting the starting and stopping of the frequency converter 10. In order to simplify the disclosure, I have assumed that the converter 10 can be started by closing the switch 12 so that the full voltage of the circuit 1 is impressed across the motor terminals. This result is accomplished by the closing of a manually controlled switch 30 which, when closed, completes an energizing circuit for the closing coil 31 of the switch 12. It will be understood, however, that any other starting arrangement, examples of which are well known in the art, may be employed for starting the motor 11 of the converter 10 and that the manually controlled switch 30 may be automatically controlled in any desired manner.

In order not to have the reactor 17 connected in circuit during the starting operation, I provide the voltage relay 23 with the normally closed contacts 32 which are connected in an energizing circuit for the closing coil 29 of the switch 18 so as to insure that this switch 18 is closed during the starting operation until the converter speed has reached such a value that the voltage of the generator 13 is sufficient to operate the voltage relay 23.

The operation of the arrangement shown in the drawing is as follows: It will be assumed that the frequency converter 3 is carrying substantially full load so that the contacts 28 of the relay 27 are open and it is desired to place the converter 10 in parallel with the converter 3. In order to do this, the manually controlled switch 30 is operated so as to complete an energizing circuit for the closing coil 31 of the circuit breaker 12. At the same time a circuit is completed for the closing coil 29 of the switch 18 to complete a shunt circuit around the reactor 17. This energizing circuit is from one side of a suitable control circuit through the contacts of the switch 30, conductor 33, contacts 32 of voltage relay 23, conductor 34, closing coil 29 of switch 18 to the other side of the control circuit. With both of the switches 12 and 18 closed, full voltage is impressed across the armature winding of the induction motor 11 which then starts and accelerates the frequency converter 10.

As soon as the speed of the converter 10 reaches a predetermined value, the voltage of the generator 13 builds up to a value sufficient to operate the voltage relay 23 so that it opens its contacts 32 and closes its contacts 35, 36 and 37. Since it is assumed that the contacts 28 of the relay 27 are open, the opening of the contacts 32 which are in parallel with the contacts 28 effects the deenergization of the closing coil 29 of the switch 18 so that this switch opens and removes the shunt circuit around the reactor 17. The insertion of the reactor 17 in series with the armature winding of the motor 11 controls the slip of the motor 11 so that the maximum speed, to which the converter accelerates, is substantially its normal full load speed. By closing its contacts 36 and 37 the voltage relay 23 renders the automatic synchronizer 20 operative to control the closing of the circuit breaker 14. As soon as proper phase relation occurs between the voltages of the generator 13 and the circuit 2, the automatic synchronizer 20 closes its contacts 21 and completes an energizing circuit for the closing coil 22 of the switch 14. This energizing circuit is from one side of the control circuit through contacts of switch 30, conductor 33, contacts 35 of relay 23, conductor 38, contacts 21 of the automatic synchronizer 20, conductor 39, closing coil 22 of the circuit breaker 14 to the other side of the control circuit. By closing its main contacts, the circuit breaker 14 connects the generator 13 directly to the circuit 2. By closing its auxiliary contacts 40, the circuit breaker 14 completes a locking circuit for its closing coil 22 which is independent of the contacts 21 of the automatic synchronizer 20 so that a subsequent opening of these contacts does not effect the opening of the circuit breaker 14. By closing its auxiliary contacts 41, the circuit breaker 14 completes an energizing circuit for the closing coil 29 of the circuit breaker 18 so as to complete a shunt circuit around the reactor 17 after the generator 13 has been synchronized. This energizing circuit is from one side of the control circuit through contacts of switch 30, conductor 33, auxiliary contacts 41 on circuit breaker 14, conductor 34, closing coil 29 of circuit breaker 18 to the other side of the control circuit.

If at the time the converter 10 is placed in operation the load on the converter 3 is such that the contacts 28 of the relay 27 are closed, it will be observed that the closing coil 29 of the circuit breaker 18 is energized during the synchronizing operation. Therefore, under such load conditions the converter 10 operates at its normal no load speed during the synchronizing operation.

If at the time the converter 10 is started the voltage across the circuit 2 is below a predetermined value so that the contacts 25 of the voltage relay 24 are closed, thereby indicating that no other source is connected to the circuit 2, a circuit is immediately completed for the closing coil 22 of the circuit breaker 14 upon the closing of the contacts 35 of the voltage relay 23. This circuit is from one side of the control circuit through contacts of switch 30, conductor 33, contacts 35 of relay 23, conductor 38, contacts 25 of relay 24, conductor 39, closing coil 22 of the circuit breaker 14 to the other side of the control circuit.

In Fig. 2, I show another type of voltage reducing means which may be used instead of the reactor 17 in Fig. 1 to cause the motor 11 to slip the desired amount during the synchronizing operation. In this modification, the voltage reducing means is a single phase auto-transformer 50, the primary winding of which is arranged to be connected across one phase of the circuit 1 and the secondary winding of which is arranged to be connected to one phase of the motor 11 when the switch 18 is open.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is,—

1. In combination, two alternating current circuits having different frequencies which vary relative to each other, a frequency converter comprising an alternating current motor connected to one of said circuits and driving a synchronous generator, means controlled by the load connected to the other of said circuits for controlling the speed of said motor while said generator is disconnected from said other circuit, and means controlled by the phase relation of said generator and said other circuit for effecting the connection of said generator to said other circuit.

2. In combination, two alternating current circuits having different frequencies which vary relative to each other, a frequency converter comprising an induction motor connected to one of said circuits and driving a synchronous generator, means controlled by the load connected to the other of said circuits for varying the slip of said induction motor while said generator is disconnected from said other circuit, and means for connecting said generator to said other circuit while said induction motor remains connected to said one of said circuits including means for initiating the operation of said connecting means prior to phase coincidence of the voltages of said generator and said other circuit at a predetermined angle which varies with the frequency difference between said voltages.

3. In combination, two alternating current circuits having different frequencies which vary relative to each other, a frequency converter comprising an induction motor connected to one of said circuits and driving a synchronous generator, means controlled by the load connected to the other of said circuits for varying the slip of said induction motor while said generator is disconnected from said other circuit, means for connecting said generator to said other circuit while said induction motor remains connected to said one of said circuits including means for initiating the operation of said connecting means prior to phase coincidence of the voltages of said generator and said other circuit at a predetermined angle which varies with the frequency difference between said voltages, and means controlled by the connection of said generator to said other circuit for rendering said load controlled means inoperative to vary the slip of said induction motor.

4. In combination, two alternating current circuits, a frequency converter including an induction motor connected to one of said circuits and driving a synchronous generator which supplies current to the other circuit, a second frequency converter including a second induction motor connected to said one of said circuits and driving a second synchronous generator, voltage reducing means connected in circuit with one of the windings of said second induction motor whereby the no load slip thereof is increased to a predetermined value, and means for connecting said second generator to the other of said circuits while said second induction motor remains connected to said one of said circuits including automatic synchronizing means for initiating the operation of said connecting means prior to phase coincidence of the voltages of said generators at a predetermined angle which varies with the frequency difference between said voltages.

5. In combination, two alternating current circuits, a frequency converter including an induction motor connected to one of said circuits and driving a synchronous generator which supplies current to the other circuit, a second frequency converter including a second induction motor connected to said one of said circuits and driving a second synchronous generator, voltage reducing means connected in circuit with one of the windings of said second induction motor whereby the no load slip thereof is increased to a predetermined value, means for connecting said second generator to the other of said circuits while said second induction motor remains connected to said one of said circuits including automatic synchronizing means for initiating the operation of said connecting means prior to phase coincidence of the voltages of said generators at a predetermined angle which varies with the frequency difference between said voltages, and means controlled by the connection of said second generator to said other circuit for rendering said voltage reducing means inoperative to increase the slip of said second induction motor.

6. In combination, two alternating current circuits, a frequency converter including an induction motor connected to one of said circuits and driving a synchronous generator which supplies current to the other circuit, a second frequency converter including a second induction motor connected to said one of said circuits and driving a second synchronous generator, reduced voltage means controlled by the load transferred between said circuits by said first mentioned converter for effecting the connection of said reduced voltage means in circuit with the primary winding of said second induction motor, and means for connecting said second generator to the other of said circuits while said second induction motor remains connected to said one of said circuits including automatic synchronizing means for initiating the operation of said connecting means prior to phase coincidence of the voltages of said generators at a predetermined angle which varies with the frequency difference between said voltages.

7. In combination, two alternating current circuits, a frequency converter including an induction motor connected to one of said circuits and driving a synchronous generator which supplies current to the other circuit, a second frequency converter including a second induction motor connected to said one of said circuits and driving a second synchronous generator, a reduced voltage means controlled by the load transferred between said circuits by said first mentioned converter for effecting the connection of said reduced voltage means in circuit with the primary winding of said second induction motor, means for connecting said second generator to the other of said circuits while said second induction motor remains connected to said one of said circuits including automatic synchronizing means for initiating the operation of said connecting means prior to phase coincidence of the voltages of said generators at a predetermined angle which varies with the frequency difference between said voltages, and means responsive to the connection of said second generator to said other circuit for removing said voltage reducing means from the circuit.

8. In combination, two alternating current circuits, a frequency converter including an induction motor connected to one of said circuits and driving a synchronous generator which supplies current to the other circuit, a second frequency converter including a second induction motor, connected to said one of said circuits and driving a second synchronous generator, a voltage reducing means connected in circuit with the primary winding of said second induction motor whereby the no load slip thereof is a predetermined value, and means controlled by the phase relation between the voltages of said generators for effecting the connection of said second generator to said other circuit.

9. In combination, two alternating current circuits, a frequency converter including an induction motor connected to one of said circuits and driving a synchronous generator which supplies current to the other circuit, a second frequency converter including a second induction motor connected to said one of said circuits and driving a second synchronous generator, an impedance connected in series with the primary winding of said second induction motor whereby the no load slip thereof is a predetermined value, means controlled by the phase relation between the voltages of said generators for effecting the connection of said second generator to said other circuit, and means responsive to the connection of said second generator to said other circuit for short-circuiting said impedance.

HERMAN BANY.